(12) United States Patent
Zimmer et al.

(10) Patent No.: US 7,765,440 B2
(45) Date of Patent: Jul. 27, 2010

(54) METHOD AND APPARATUS FOR OS INDEPENDENT PLATFORM RECOVERY

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 11/478,012

(22) Filed: Jun. 29, 2006

(65) Prior Publication Data

US 2008/0005609 A1  Jan. 3, 2008

(51) Int. Cl.
G06F 11/00 (2006.01)
(52) U.S. Cl. ......................... 714/57; 709/224
(58) Field of Classification Search ............ 714/57
See application file for complete search history.

(56) References Cited

U.S. PATENT DOCUMENTS

| | | | |
|---|---|---|---|
| 5,862,308 A * | 1/1999 | Andress et al. ............... 714/10 |
| 6,073,255 A * | 6/2000 | Nouri et al. ................... 714/31 |
| 6,311,296 B1 * | 10/2001 | Congdon ...................... 714/56 |
| 6,996,502 B2 * | 2/2006 | De La Cruz et al. ........ 702/188 |
| 7,219,144 B2 * | 5/2007 | Matsuki et al. .............. 709/223 |
| 7,275,178 B2 * | 9/2007 | Inoue et al. ..................... 714/6 |
| 7,290,164 B1 * | 10/2007 | Harvey et al. .................. 714/2 |
| 7,360,111 B2 * | 4/2008 | Adya et al. ..................... 714/2 |
| 2002/0116661 A1 * | 8/2002 | Thomas et al. ................ 714/17 |
| 2003/0204778 A1 * | 10/2003 | Wilding et al. ................ 714/19 |
| 2003/0229694 A1 * | 12/2003 | Tsai et al. .................... 709/224 |
| 2004/0103175 A1 * | 5/2004 | Rothman et al. ............ 709/222 |
| 2007/0195704 A1 * | 8/2007 | Gonzalez et al. ............ 370/241 |

* cited by examiner

Primary Examiner—Scott T Baderman
Assistant Examiner—Kamini Patel
(74) Attorney, Agent, or Firm—Schwabe, Williamson & Wyatt, P.C.

(57) ABSTRACT

A system, apparatus, and method to capture recovery information of a host device, independent of the operating system of the host device, are described herein. Platform recovery management components of the host device transmit recovery information using secondary network communication channels to a remote device, such as a recovery server, independent of the operating system. In various embodiments, the remote device, such as a remote core dump repository with a diagnostics resource layer, uses ex post facto and audit diagnostic resources on the host device and/or the remote device to determine if existing repository information includes system restoration or system healing information.

25 Claims, 6 Drawing Sheets

METHOD AND APPARATUS FOR OS INDEPENDENT PLATFORM RECOVERY

TECHNICAL FIELD

Presented embodiments relate to the fields of data processing, storage, and communication. More particularly, various embodiments relate to techniques for capturing memory contents of a computing platform to log(s) and reporting platform recovery information, independent of the operating system of the computing platform.

BACKGROUND

Modern recovery systems for network enabled digital devices are substantially dependent on operating system functionality. As such, the operating system is often responsible for monitoring and responding to various operational conditions, such as operating system panic, failure, and/or lock-up. Unfortunately, this results in both a condition and a monitoring mechanism being substantially dependent on the same operating system. As a crippling operational condition may be situated within the path of observed behavior, any resulting recovery data obtained by the monitoring mechanism may also suffer from the same poisoned data path or condition that originally crippled the operating system.

In an effort to partially address these difficulties, some operating systems, such as the Windows® operating systems, define a special path for a disk driver of the operating system to log failure information to storage. Unfortunately, even having a special fast path does not eliminate the potential problems relative to a poisoned data path or a crippling operational condition, because the configuration still suffers from the possibility that the failure may be part of the operating system kernel, on which retrieval of the logged information depends.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Figure 1:
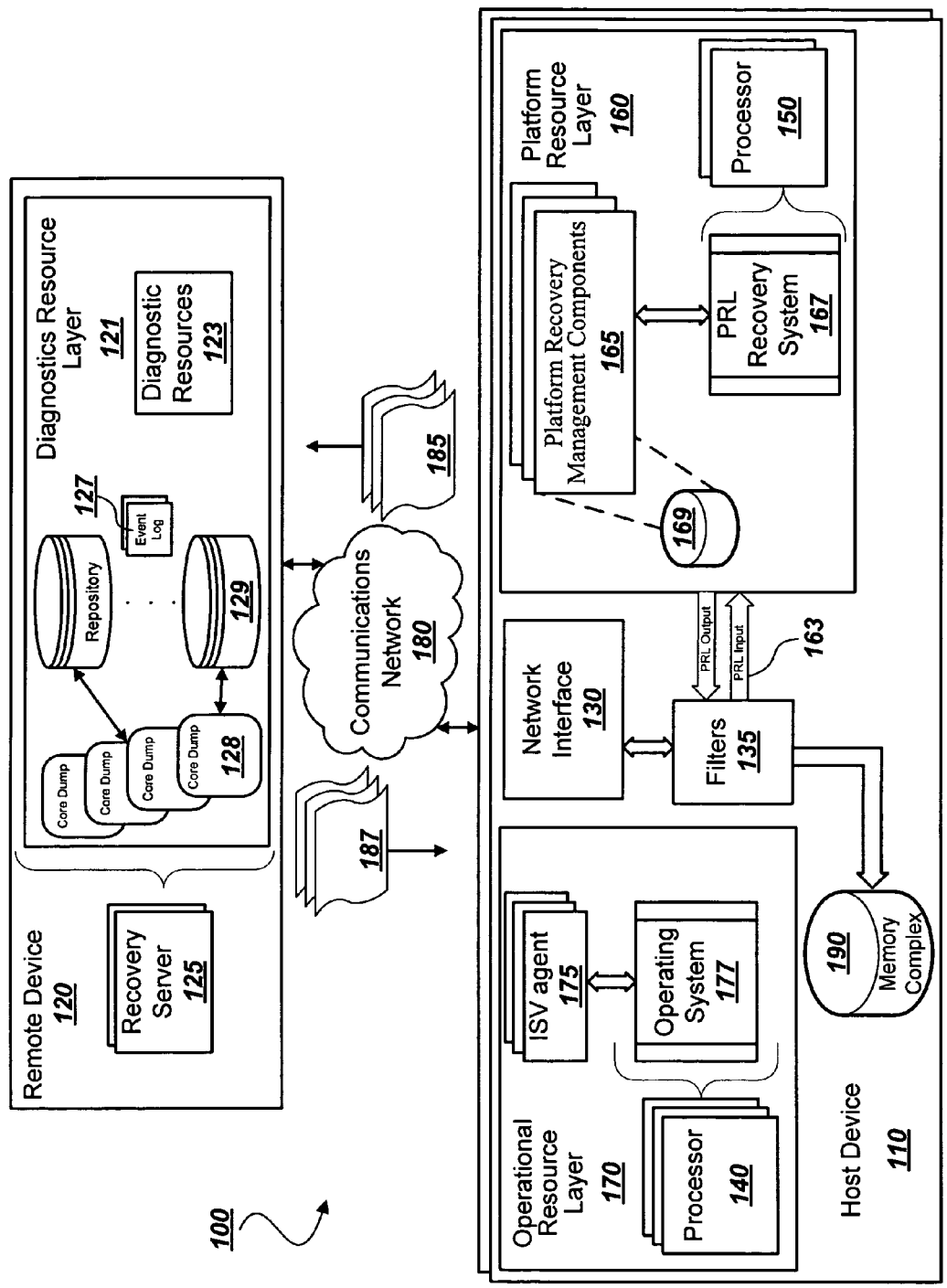
FIG. 1 illustrates a block diagram of operating system independent platform recovery by a host platform coupled with different remote network components in accordance with at least one embodiment.

Various embodiments described below have been developed in response to the current state of the art and, in particular, to the previously identified problems and needs of operating system independent recovery systems that have not been fully or completely solved by currently available recovery systems and protocols for collecting and processing recovery data. Various embodiments provide a method to increase available documentation of designated system events and reporting of recovery information, in an operating system independent manner, to improve restoration time required for a host device. In at least one embodiment, a host device transmits recovery information using secondary network communication channels to a remote device, in an operating system independent manner. The remote device, such as a recovery server (e.g., a remote core dump repository with a diagnostics resource layer), can compare the recovery information using ex post facto and audit diagnostic resources on the host device and/or the remote device to determine if existing repository information includes restoration or system healing information that may be available for the host device. Healing information, if any, may be remotely generated and may be distributed to the host device to restore the host device, in an operating system independent manner. Moreover, in a multi-core system, recovery information for each processing core may also be collated and reported to the remote device, in an operating system independent manner. Upon analyzing each individual data fragment, healing information associated with the received recovery information may be disseminated from at least one recovery server and transmitted to the respective processing cores on the host device, in an operating system independent manner.

In the following detailed description, reference is made to the accompanying drawings which form a part hereof wherein like numerals designate like parts throughout, and in which specific embodiments are shown by way of illustration. It is to be understood that other embodiments may also be utilized and structural or logical changes may be made without departing from the scope of various embodiments of the invention. In other instances, well-known circuits, structures, and techniques have not been shown in detail in order not to obscure the understanding of this description. Therefore, the following detailed description is not to be taken in a limiting sense, and the scope of the various embodiments is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Reference in the specification to a "digital device" means that a particular feature, structure, or characteristic; specifically, the device operable programmability or the ability for the device to be configured to perform various functions, is included in at least one embodiment of the digital device as used herein. Typically, digital devices may include general and/or special purpose computing devices, such as a server, a workstation, a desktop and/or laptop computer, a personal digital assistant (PDA), a mobile phone, and/or console suitably configured for practicing the present invention in accordance with at least one embodiment. The terms "client device" and "host device" are often synonymously used herein and are interchangeable with digital device as previously defined. Reference in the specification to "remote device" means a network device electronically coupled to the digital device or host platform via a network interface and suitably configured for practicing the present invention in accordance with at least one embodiment. Exemplary network devices may include general and/or special purpose computing devices, such as a remote core dump repository, a network access policy decision point (PDP), a Policy Enforcement Point (PEP), a gateway, a router, a bridge, a switch, a hub, a repeater, and/or a server.

Referring to FIG. 1, a high-level block diagram illustrating an overview of the invention in accordance with various embodiments is shown. A recovery system 100 includes a host device 110 in communication with a remote device 120 via a communication network 180, such as the Internet. The host device includes various host resources, such as at least one networking interface 130, at least one first processor 140, and at least one second processor 150. Each of the various host resources may be selectively assigned to a resource layer, such as a platform resource layer 160 or an operational resource layer 170. In one embodiment, the selective assignment may be temporary and a subsequent reassignment of the resource, following suitable authentication and validation, may be made to another resource layer. Alternatively, in one embodiment, the various host accessories may be dedicated and/or permanently assigned to one of the available resource layers.

In one embodiment, the host device 110 selects the at least one processor 140 and the at least one second processor 150 from a plurality of processing cores co-disposed in an integrated circuit package. As such, the term "processor", as used herein, should be interpreted to mean an individual processor, firmware logic, reconfigurable logic, a hardware description language logic configuration, a state machine, an application-specific integrated circuit, a processing core co-disposed in an integrated circuit package with at least one other processing core and/or component, or combinations thereof.

In one embodiment illustrated in FIG. 1, the platform resource layer 160 includes the at least one second processor 150, an input/output interface 163 adapted to be coupled to the at least one networking interface 130, and an integrated platform storage 169 having one or more platform recovery management components 165. The operational resource layer 170 includes at least one first processor 140 adapted to execute an operating system 177 and one or more software components 175, such as independent software vendor (ISV) agents.

The platform resource layer 160 may also include integrated platform storage 169 and network-aware recovery systems 167 to capture system state information upon designated system events. In one embodiment, the captured system state information includes, but is not limited to, logging and optionally transmitting platform recovery information 185 across the communications network 180.

In various embodiments, the platform resource layer 160 is configured to operate independent of the at least one first processor 140, the operating system 177, and/or the one or more software components 175. As such, in one embodiment, the at least one second processor 150 is configured to operate the one or more platform recovery management components 165 independent of the at least one first processor 140. Moreover, in one embodiment, the one or more platform recovery management components 165 are adapted to capture platform recovery information 185 of a memory complex 190 of the host device 110, independent of the operating system 177. Additionally, in one embodiment, the at least one networking interface 130 includes a platform recovery network interface associated with the host device 110 and adapted to transmit the platform recovery information 185 independent of the operating system.

The platform recovery information 185 of the memory complex 190 of the host system 110 may be stored on either the integrated platform storage 169 and/or a remote storage repository 129 of the host device 110. Memory and/or storage on a storage medium includes any mechanism that provides (i.e., stores and/or transmits) information in a form readable by a machine (e.g., a computer). For example, a storage medium includes read only memory (ROM), random access memory (RAM), magnetic disk storage media, optical storage media, flash memory devices, electrical, optical, acoustical or other form of propagated signals (e.g., carrier waves, infrared signals, digital signals), and the like.

In one embodiment, the one or more platform recovery management components 165 are configured to transmit the platform recovery information 185, via the at least one networking interface 130, to the remote device 120. The at least one networking interface 130 being selected from either a first networking interface adapted to transmit data associated with the at least one processor or a second networking interface adapted to transmit data independent of the at least one processor, upon expiration of a watchdog timer.

In one embodiment, the one or more platform recovery management components 165 are further configured to transmit to the remote device 120 via a second networking interface independent of the at least one processor 140. In one embodiment, the operation of the second networking interface remains independent of the operating system 177 and/or the at least one processor 140. The second networking interface may or may not be part of the at least one networking interface 130, depending on whether portions of the at least one networking interface 130 can be sequestered from the operating system 177 and one or more software components 175.

In one embodiment, the resources of the platform resource layer 160 are sequestered during the initialization and/or boot-up procedures of the host device 110. In one embodiment, the platform resource layer 160 can reserve some region of the local storage on the host device 110 and/or have a data cache across the communications network 180 which is managed by the platform resource layer 160, a remote authority, or system administrator to facilitate fault-recovery, audit, and diagnostics. An augmentation of a kernel initialization may communicate to the platform resource layer 160 via an Interpretation Bridge (IPB) the extent of physical memory available so that in the event of a failed in-band flow the platform resource layer 160 can preserve memory and log available recovery information to the sequestered portion of storage or directly to an administrator's remote console. In many cases, this memory image may be the equivalent of the core dump and enables ex post facto evaluation of the system to discern whether the failure was based upon errant software state or upon a hardware malady.

In one embodiment, the platform resource layer 160 is activated upon a watchdog-timer expiration of at least one designated system event, such as system error signaling. Upon expiration of the timer, the platform resource layer 160 controller will automatically log system memory complex 190 into the integrated platform storage 169 or remote storage repository 129. This provides for an autonomic flow shielded from maladies originating in the operating system 177 and/or the one or more software components 175. Reliance upon the platform resource layer 160 and the PRL recovery system 167, instead of the operating system 177, allows for easier validation of the integrity of the code, as the PRL recovery system 167 will be relatively small (e.g., about $1/120^{th}$ the size or about 500,000 lines of code versus about 60,000,000 lines of code) when compared with the operating system code 177.

Referring to the remote device 120, one embodiment includes a diagnostics resource layer 121, diagnostic resources 123, a recovery server 125, and a remote storage repository 129. In one embodiment, the diagnostics resource layer 121 operates across both the available diagnostic resources 123 and the recovery server 125. The remote storage repository 129 may be directly associated with the recovery server 125 or merely be an associated database resource.

Upon receiving platform recovery information 185, the diagnostics resource layer 121 of the remote device 120 is adapted to generate and/or to analyze an event log 127 based in part on the platform recovery information 185. The platform recovery information 185 may include an execution history of the operating system 177 and/or the one or more software components 175 by the at least one first processor 140. The execution history may be supported by a core dump 128 of each of the at least one first processor(s) 140 being monitored.

In this manner, the platform resource layer 160 and the diagnostics resource layer 121 interface together to provide a method to increase available documentation of designated system events and thereby report platform recovery information 185, such as captured content, event logs 127, and core dumps 128 to improve chances of restoration for a host device 110 after detection of a specified event.

The remote device 120, such as a recovery server 125 (e.g., a remote storage repository 129 with a diagnostics resource layer 121 and at least one core dump 128), can compare the recovery information using ex post facto and audit diagnostic resources on the host device 110 and/or the remote device 120 to determine if existing information on the remote storage repository 129 includes restoration or healing information 187 that may be available for the host device 110. Healing information 187, if any, is generated in an operating system independent manner and may be distributed, independent of the operating system, to restore the host device 110.

In a multi-processor system, platform recovery information 185 for each processor and/or processing core may be collated and reported to the remote device 120. Upon analyzing each individual data fragment, healing information 187 associated with the received platform recovery information 185 may be transmitted from at least one recovery server 125 and transmitted to the respective processing cores, such as the at least one first processor 140 on the host device 110.

Upon determining that restoration may be possible, the diagnostics resource layer 121 obtains the restoration or healing information 187 from the remote device 120 based in part on a comparison of the transmitted platform recovery information 185 and information available in the remote storage repository 129. In one embodiment, the platform recovery information 185 stored in the remote storage repository 129 includes an error event log 127 and/or at least one core dump 128. In one embodiment, the error event log 127 includes chipset settings and hardware inventory information to allow for audit diagnostics and for ex post facto diagnostics.

In various embodiments, the platform recovery information 185 may be analyzed upon detection of operational failure of the host device 110, expiration of an operational timer, and/or abnormal loss of communication with the host device 110. In one embodiment, the detected operational failure of the host device 110 is a failure of the at least one first processor 140. The failure of the at least one processor 140 may include one or more host and/or operating system operating codes selected from the group consisting of panic, failure, lock-up, and/or error codes. As previously indicated, in a multi-core configuration, the stored platform recovery information 185 in the remote storage repository 129 may include a core dump 128 of each processing core of the plurality of processing cores. As such, although the one or more host and/or operating system operating codes might only appear on one of the processing cores, the operating information from all of the processing cores is available to determine if there are interrelated events.

In one embodiment, a recovery timer on platform resource layer 160 of the host device 110 is adapted to initiate the transmission of any stored platform recovery information to the remote device 120. This automatic update allows the remote device 120 to maintain an operational history of the host device 110. This operational history may then be used to create the restoration or healing information 187.

Figure 2:
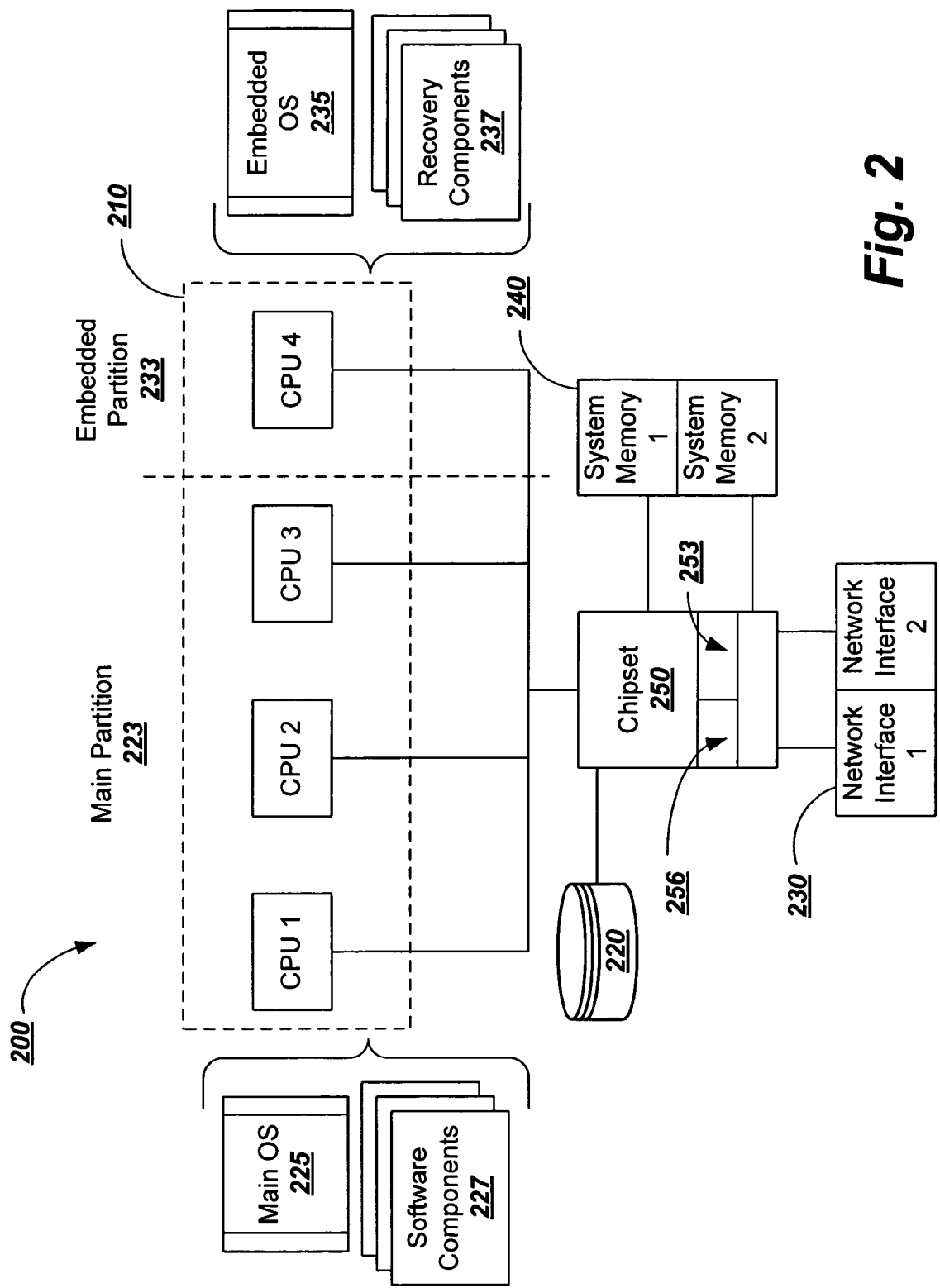
FIG. 2 illustrates an operating system independent platform recovery host device in accordance with at least one embodiment.

Referring to FIG. 2, a block diagram of a multi-core host system 200 is shown in accordance with various embodiments. The system 200 includes a plurality of processing cores 210, a mass storage device 220, a first and a second network interface 230, memory 240, and a chipset 250.

The plurality of processing cores 210 may include any variety of processors known in the art having a plurality of processing cores, for example, an Intel® Pentium® D dual core processor. The plurality of processing cores 210 may comprise an integrated circuit (IC), such as a semiconductor integrated circuit chip. In the embodiment illustrated in FIG. 2, the plurality of processing cores 210 may include a plurality of core CPUs, for example, CPU1, CPU2, CPU3, and CPU4. Additional or fewer processor cores may be used in various embodiments. The plurality of processing cores 210 may be logically and/or physically divided into a plurality of partitions. For example, in the illustrated embodiment, the plurality of processing cores 210 are selectively assigned to one of two partitions, a main partition 223 (CPU1, CPU2, CPU3) or an embedded partition 233 (CPU4). In one embodiment, the plurality of processing cores 210 have at least one first processing core (CPU1, CPU2, CPU3) coupled, via chipset 250, with the first network interface 230 and the mass storage device 220.

Although the assignment of the processing cores 210 to a particular partition may be temporary, a subsequent reassignment of the processing core may necessitate a suitable isolation, authentication, and/or validation to maintain independence of the embedded partition from the operating system 225. For example, a processing core may be reassigned through a sequestering process on start-up prior to activation of the operating system. Alternatively, in one embodiment, the various processing cores 210 may be dedicated and/or permanently assigned to one of the available partitions.

The at least one processing core associated with the main partition 223 is adapted to execute the one or more software components 227 and the operating system 225 which may include, for example, a general operating system such as Windows® operating systems, Linux, etc. The at least one processing core associated with the embedded partition 233 is adapted to execute the one or more platform recovery management components 237 to determine platform recovery information, independent of the main operating system 225.

In one embodiment, the at least one processing core associated with the embedded partition 233 is further adapted to execute an embedded operating system 235. The embedded operating system 235 may include, for example, BSD variants (OpenBSD, NetBSD, FreeBSD), Linux, Windows CE®, and/or other operating systems, such as a Real-Time operating system (VxWorks, ThreadX, RTLinux), or even an OS-absent operational environment (e.g., EFI). As will be described in greater detail below, in various embodiments, the embedded operating system 235 may be capable of controlling the operation of one or more mass storage devices 220 and/or network interfaces 230 coupled to the chipset 250.

The one or more platform recovery management components 237 of the embedded partition 233 are adapted to transmit stored platform recovery information to a remote device via at least one of the network interfaces 230. In one embodiment, the remote device includes a remote core dump repository that includes restoration and/or system healing information associated with different types of recovery information. Accordingly, in one embodiment, the one or more platform recovery management components 237 of the embedded partition 233 are further adapted to receive restoration and/or system healing information from the remote device. In addition to being optionally coupled to a second network interface 230, the embedded partition 233 may also be coupled to a dedicated portion of memory 240 configured to store the platform recovery information.

System memory 240 may include semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 240 may comprise other and/or later-developed types of computer-readable memory. Machine-readable firmware program instructions may be stored in memory 240. As described below, these instructions may be accessed and executed by the main partition 223 and/or the embedded partition 233 of host processor 210. In this embodiment, memory 240 may be logically and/or physically partitioned into system memory 1 and system memory 2. System memory 1 may be capable of storing commands, instructions, and/or data for operation of the main partition 223 and system memory 2 may be capable of storing commands, instructions, and/or data for operation of the embedded partition 233.

Chipset 250 may include integrated circuit chips, such as integrated circuit chipsets manufactured and/or sold by different vendors, such as Intel® (e.g., graphics memory and I/O controller hub chipsets), although other integrated circuit chips may also or alternatively be used. Chipset 250 may also include inter-partition bridge circuitry 256. "Circuitry", as used in any embodiment herein, may comprise, for example, singly or in any combination, hardwired circuitry, programmable circuitry, state machine circuitry, and/or firmware that stores instructions executed by programmable circuitry. The inter-partition bridge circuitry 256 may be capable of providing communication between the main partition 223 and the embedded partition 233. Chipset 250 may also be coupled to a plurality of mass storage systems 220.

In one embodiment, embedded partition 233 may be capable of controlling the chipset 250 to exchange commands and/or data with one or more system 200 resources coupled to chipset 250 using at least one of a plurality of communication protocols. The embedded partition 233 may also be capable of gathering recovery information related to the resources coupled to the chipset 250. Embedded partition 233 may also be capable of mapping two or more remote resources into a logical device 253. To that end, embedded partition 233 may be capable of generating a map that correlates logical block address (LBA) information of the logical device 253. The logical device 253 may include, for example, a single large extended device (SLED). In one embodiment, the logical device 253 may be stored in association with the inter-partition bridge circuitry 256 so that the main partition 223, during restoration, can access the logical device 253.

Figure 3:
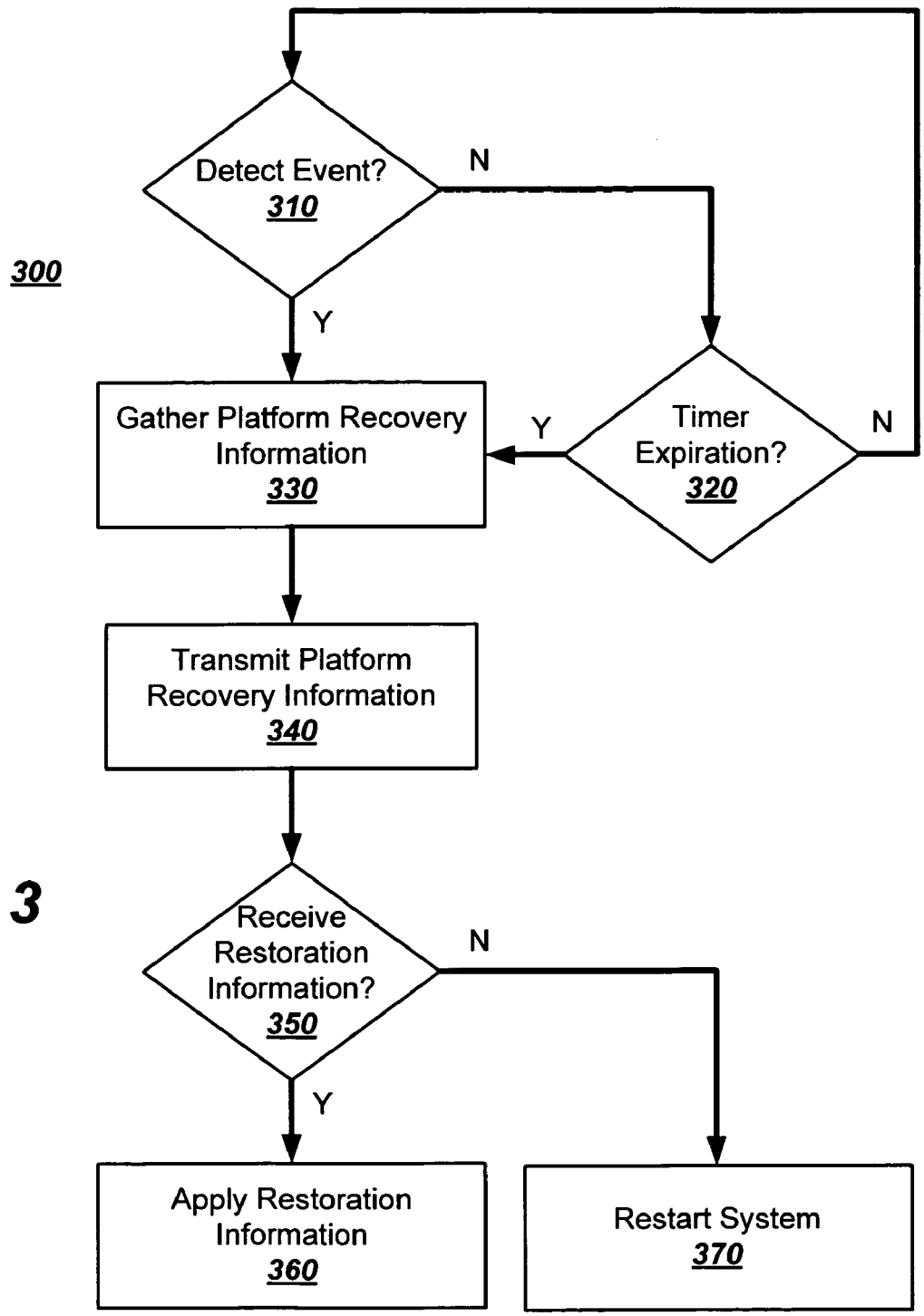
FIG. 3 illustrates a flow diagram view of a portion of the operations of a host device as presented in FIG. 1 in further detail, in accordance with various embodiments.
Figure 4:
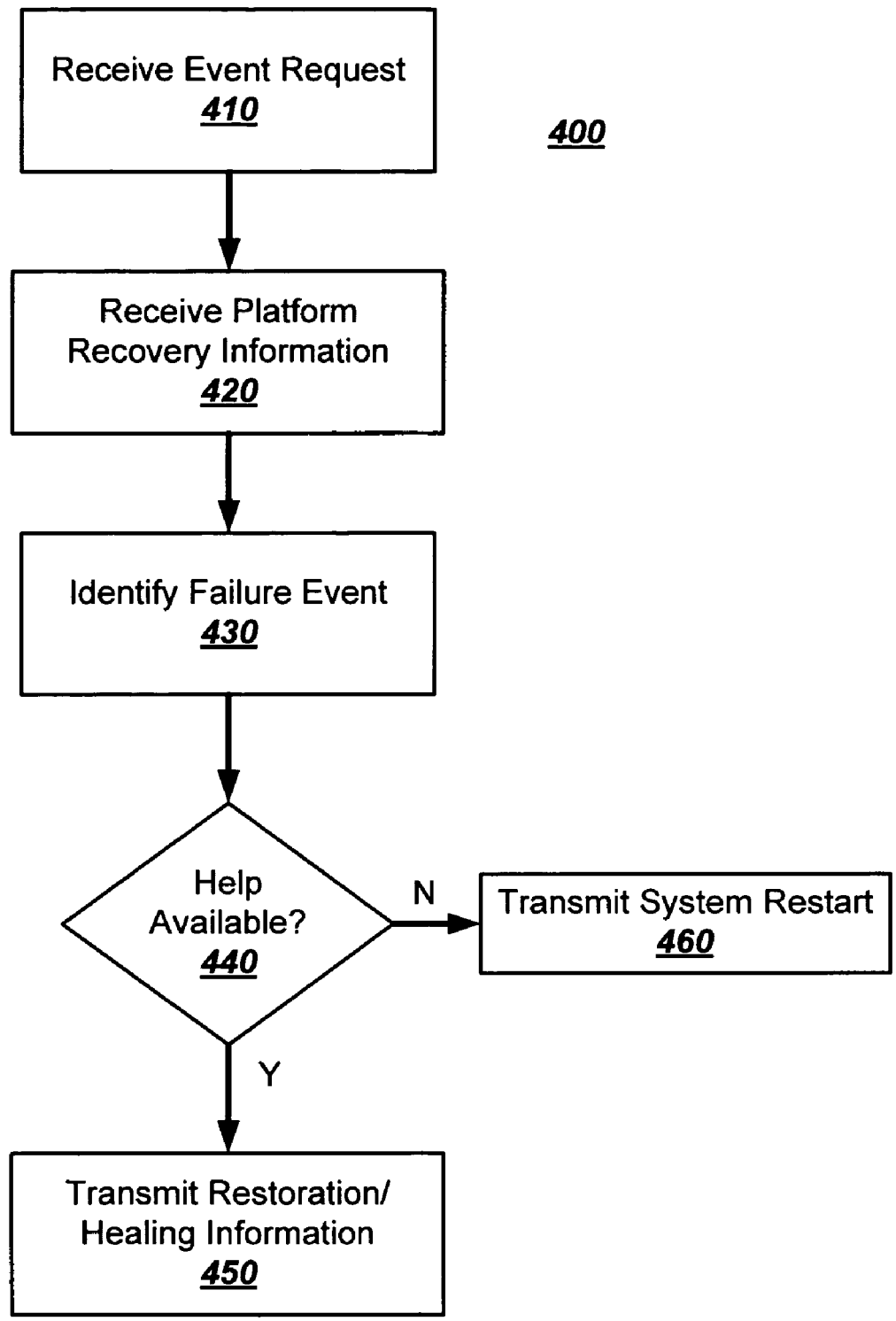
FIG. 4 illustrates a flow diagram view of a portion of the operations of a remote device as presented in FIG. 1 in further detail, in accordance with various embodiments.
Figure 5:
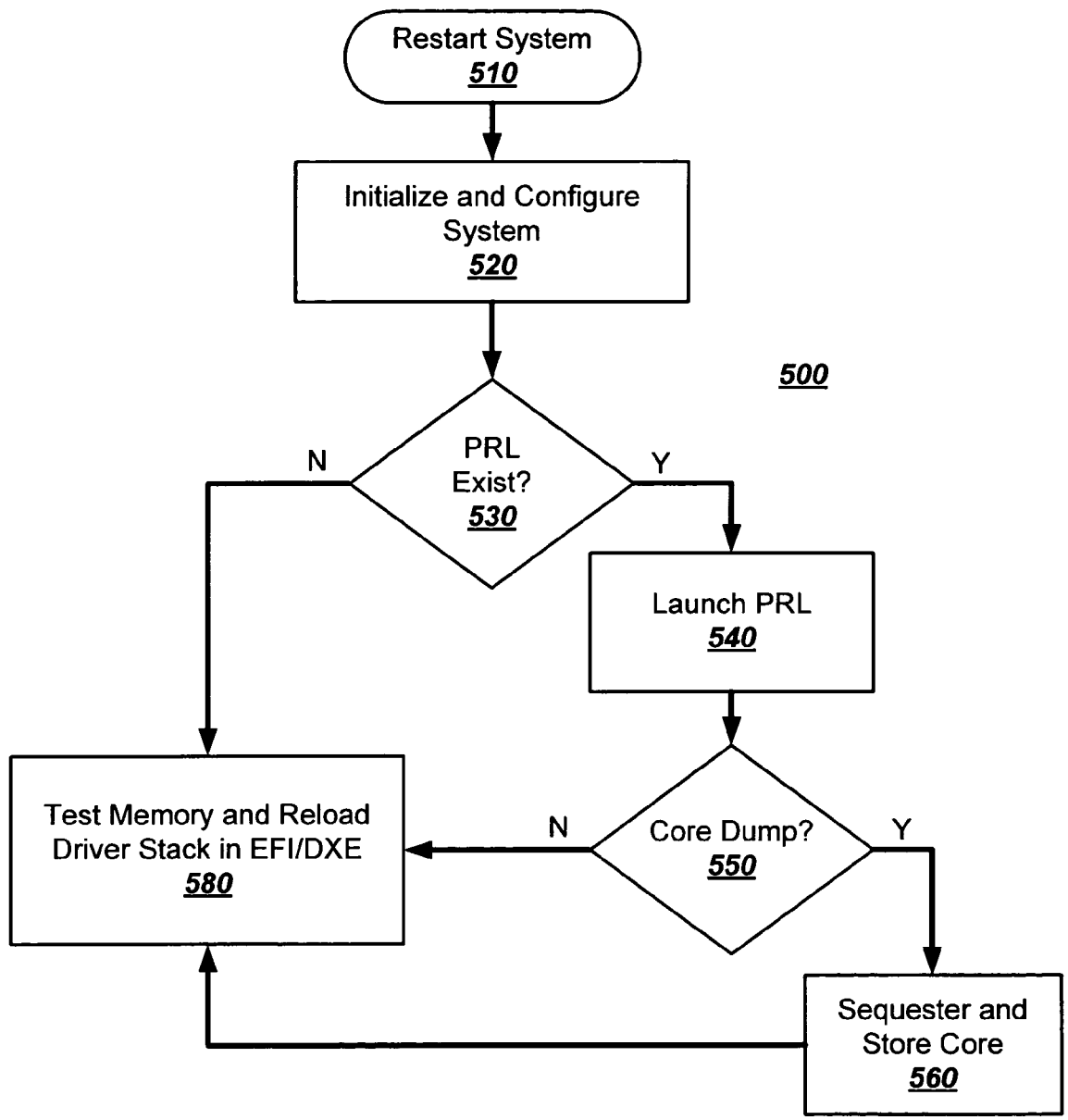
FIG. 5 illustrates a flow diagram view of a portion of the operations of a host platform as presented in FIG. 1 in further detail, in accordance with various embodiments.

Turning now to FIGS. 3 to 5, methods, in accordance with various embodiments, are described in terms of computer firmware, software, and hardware with reference to a series of flow diagrams. In various embodiments, portions of the operations to be performed by a host platform device and/or remote devices may constitute state machines or computer programs made up of computer-executable instructions. These instructions are typically maintained in a storage medium accessible by the host platform device and/or remote devices.

Describing the methods by reference to a flow diagram enables one skilled in the art to develop such programs, including such instructions to carry out the methods on suitably configured host platforms and/or remote devices. In various embodiments, at least one of the processors of a suitably configured host platform and/or remote device executes the instructions from the storage medium. In various embodiments, the computer-executable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface to a variety of operating systems.

In addition, the present invention is not described with reference to any particular programming language. It will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of conveying that execution of the software by a network device causes the processor of the computer to perform an action or produce a result.

Referring to FIG. 3, a flow diagram view of a portion of the operations of a host device and/or system 300 as presented in FIG. 1 is shown in further detail, in accordance with various embodiments. Query operations of the system 300 in block 310 may include detecting designated system events, such as system panic, failure, lock-up, and/or error codes. If no system events are detected, query operations of the system 300 in block 320 may include checking whether a platform event timer has expired. If the platform event timer has not expired, operations of the system 300 may return to block 310. If either a designated system event is detected by the system 300 in block 310 or the system 300 determines that a timer has expired in block 320, operations of the system 300 in block 330 include gathering platform recovery information independent of the operating system. Additional operations of the system 300 in block 340 include transmitting the collected platform recovery information to a remote device, such as a recovery server with an associated remote core dump repository. Query operations of the system 300 in block 350 may include determining whether restoration and/or system healing information has been received. If the system 300 receives the restoration and/or system healing information, operations of the system 300 in block 360 include applying the restoration and/or system healing information to the system 300, independent of the operating system. If the system 300 receives no additional restoration and/or system healing information, operations of the system 300 in block 370 may include restarting the system. In one embodiment, the activation of the restart process is dependent on at least one of the expiration of a response timer and/or detection of a subset of designated system events, which may leave the system 300 unavailable without restart or restoration. One exemplary subset of designated system events includes system panic, failure, lock-up, and/or error codes.

Referring to FIG. 4, a flow diagram view of a portion of the operations of a remote device and/or system 400 as presented in FIG. 1 is shown in further detail, in accordance with various embodiments. Operations of the system 400 in block 410 may include receiving an event and/or error request for a processing core and/or associated platform components of the apparatus. Operations in block 420 may include receiving platform recovery information collected by one or more platform recovery management components of the apparatus, independent of an operating system of the apparatus. In one embodiment, the received platform recovery information is associated with the received event and/or error request of the apparatus. Operations in block 430 may additionally include detecting a failure event based in part on the received error request and/or the received platform recovery information. Query operations in block 440 may include determining whether restoration and/or healing information is available, based at least in part on the received platform recovery information. If the restoration and/or healing information is available, the operations of at least one embodiment further include determining, in additional query operations, whether to provide the restoration and/or system healing information. If healing information is to be provided, additional operations in block 450 include retrieving what restoration and/or system healing information, if any, is to govern a remote core dump restoration of the apparatus, based at least in part on the received platform recovery information, and transmitting the result of the recovery determination to the apparatus, including the remote core dump restoration, if any. If restoration and/or healing information is not to be provided, further operations in one embodiment include transmitting a system restart to the host device in block 460.

Referring to FIG. 5, a flow diagram view of a portion of the operations of a system 500 based on the host device as presented in FIG. 1 is shown in further detail, in accordance with various embodiments. Operations of the system 500 in block 510 may include restarting the system 500. Additional operations of the system 500 in block 520 may include initializing and configuring system resources such as memory caches, filters, timers, and processors. In one embodiment, the initialization process includes partitioning and sequestering the resources of the system 500 as previously described. Query operations of the system 500 in block 530 include determining whether a platform resource layer exists. If the platform resource layer exists, operations of the system 500 in block 540 include launching the platform resource layer. Otherwise, if the platform resource layer does not exist, operations of the system 500 in block 580 include testing memory and loading the remainder of the driver stack via an extensible firmware interface (EFI) and/or a driver execution environment (DXE).

Query operations of the system 500 in block 550 may include determining whether a processing core dump is supported by the active platform resource layer. Otherwise, operations of the system 500 return to block 580 as previously described.

If the system 500 determines that a core dump is supported, the operations of the system 500 in block 560 include obtaining the size of the system memory and sequestering additional regions of available storage to store code files. As previously indicated, the storage may include host system and/or remote system storage locations. Once the memory has been reallocated the operations of the system 500 return to block 580, as previously described.

Figure 6:
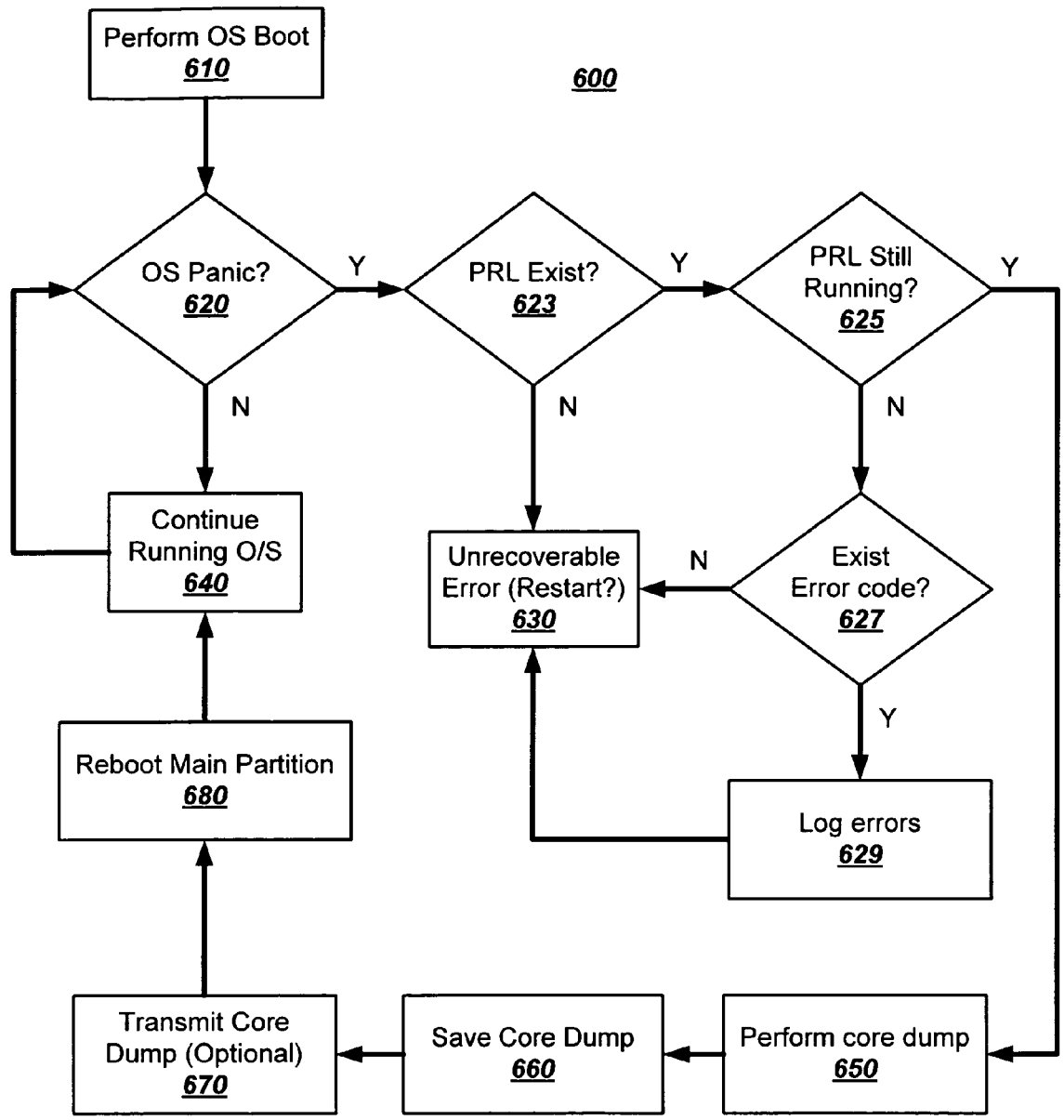
FIG. 6 illustrates a flow diagram view of a portion of the operations of a host platform as presented in FIG. 1 in further detail, in accordance with various embodiments.

Referring to FIG. 6, a flow diagram view of a portion of the operations of a system 600 based on the host device as presented in FIG. 1 is shown in further detail, in accordance with various embodiments. Operations of the system 600 in block 610 include performing a boot of the host operating system. Query operations of the system 600 in block 620 may include determining whether an operating system event/error, such as panic, failure, lock-up, and/or error codes has been detected. If not, operations of the system 600 include continuing to run the operating system in block 640 and to monitor for designated system events in block 620.

Upon determining that a system event has occurred, operations of the system 600 in query block 623 may include determining whether a platform resource layer or its equivalent exists. If the system 600 determines that the platform resource layer exists, operations of the system 600 in query block 625 include determining whether the platform resource layer is still running. Otherwise, operations of the system 600 in query block 630 indicate that the system 600 has encountered an error from which it cannot recover. Unfortunately, in various embodiments, the only safe action the system 600 can take in block 630 is to restart the computer. As a result, data may be lost as no opportunity is provided to save data that has not yet been saved to the hard drive.

If the system 600 in block 625 determines that the platform resource layer is not running, query operations of the system 600 in block 627 include determining whether any error codes exist regarding why the platform resource layer is no longer running and/or which operating system error codes are registered. If no error codes exist, operations of the system 600 in block 630 are as previously described. If the system 600 determines that error codes do exist, operations of system 600 in block 629 include logging available errors. In one embodiment, the errors may be logged in the system 600 operating in a management mode. Once the available errors are logged, operations of the system 600 in block 630 are as previously described.

If the system 600 in block 625 determines that the platform resource layer is running, operations of the system 600 in block 650 include performing a core dump of each processor in the system 600. Operations of the system 600 in block 660 include saving the core dump in memory. As previously indicated, the memory may include host system and/or remote system storage locations. Operations of the system 600 in block 670 include optionally transmitting the core dump data to a remote device for ex post facto and audit diagnostics. Operations of the system 600 in block 680 include rebooting the main partition upon detection of designated system events, as previously described.

Although specific embodiments have been illustrated and described herein, it will be appreciated by those of ordinary skill in the art and others that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that various embodiments of the invention be limited only by the claims and the equivalents thereof.

What is claimed is:

1. An apparatus comprising:
   a first resource layer including
      a first and a second storage device,
      a first processor, configured to execute an operating system (OS) and one or more software components, and a first networking interface, configured to couple the first processor to a network; and a second resource layer including
a second processor, coupled to the first storage device, wherein the second processor is configured to operate independent of the first processor and said OS, and
a second networking interface, configured to couple the second resource layer to the network independent of the first interface, the first processor and the OS;
wherein the first processor and the second processor are co-disposed on an integrated circuit;
wherein the second resource layer is configured to log recovery information of the apparatus, upon expiration of a timer, store the logged recovery information on the second storage device and transmit through the second networking interface the recovery information to a remote server for diagnose and restoration analysis.

2. The apparatus of claim 1, wherein the second resource layer is also configured to log recovery information of the storage device, store the logged recovery information on a second storage device and transmit through the second networking interface the recovery information to a remote server for diagnose and restoration analysis upon detection of a failure of the apparatus.

3. The apparatus of claim 2, wherein the remote server comprises a diagnostics resource layer adapted to generate and/or to analyze an event log based in part on the recovery information of the storage device.

4. The apparatus of claim 1, wherein the recovery information includes an execution history of the operating system and/or the one or more software components by the first processor.

5. The apparatus of claim 2, wherein the detected failure of the apparatus is a failure of the first processor.

6. The apparatus of claim 5, wherein the failure of the first processor includes one or more host and/or operating system operating codes selected from the group consisting of panic, failure, lock-up, and/or error codes.

7. The apparatus of claim 2, wherein the second resource layer is configured to receive restoration information from the remote server.

8. The apparatus of claim 7, wherein the second resource layer is configured to apply the restoration information to the apparatus.

9. The apparatus of claim 1, wherein the first processor and the second processor are selected from a plurality of processing cores co-disposed in an integrated circuit package.

10. The apparatus of claim 1, wherein the second storage device is a portion of the first storage device sequestered during initiation of the apparatus.

11. A system comprising:
a first network interface and a second network interface separate and distinct from the first network interface;
a mass storage device;
a plurality of processing cores co-disposed on an integrated circuit, a first processing core being coupled with the first network interface and the mass storage device;
memory coupled to a second processing core and configured to store platform recovery information;
an operating system and one or more software components configured to be executed by the first processing core; and
one or more platform recovery management components operatively configured to be executed by the second processing core to determine and collect platform recovery information, independent of the first processing core and the operating system, and to transmit the stored platform recovery information to a remote device, via the second network interface.

12. The system of claim 11, wherein the remote device includes a remote core dump repository.

13. The system of claim 12, wherein the one or more platform recovery management components are further adapted to receive healing information from the remote device, based in part on the transmitted platform recovery information to the remote core dump repository.

14. The system of claim 11, wherein the stored platform recovery information includes an error log.

15. The system of claim 14, wherein the error log includes chipset settings and hardware inventory information to allow for audit diagnostics and for ex post facto diagnostics.

16. The system of claim 11, wherein the stored platform recovery information includes a core dump of each processing core of the plurality of processing cores.

17. The system of claim 11, further comprising a recovery timer adapted to initiate the transmission of the stored platform recovery information to the remote device.

18. The system of claim 11, wherein the one or more platform recovery management components are adapted to transmit the stored platform recovery information via the second network interface upon failure of any one of the plurality of processing cores.

19. A method comprising:
receiving an error request for a first processing core and/or associated platform components of an apparatus, by a second processing core, the first processing core being operatively configured to execute an operating system (OS) of the apparatus and being coupled to a network through a first networking interface, the first and second processing cores being co-disposed on an integrated circuit;
receiving and maintaining platform recovery information associated with the error request of the apparatus collected by one or more platform recovery management components, the second processing core being operatively configured to execute the platform recovery management components independent of the operating system;
detecting a failure event, based in part on the received error request and/or the received platform recovery information;
upon detecting a failure event,
transmitting by the second processor the platform recovery information to a remote device through a second networking interface independent of the first processor and the OS, wherein the second networking interface being separate and distinct from the first networking interface.

20. The method of claim 19, further comprising receiving by the second processor healing information from the remote device.

21. The method of claim 19, further comprising applying by the second processor the healing information to the apparatus.

22. The method of claim 19, wherein said applying the healing information includes restoring processing core registers with a default configuration.

23. An article of manufacture comprising:
a tangible computer-accessible storage medium having stored therein a plurality of programming instructions that, when executed by a machine, cause the machine to perform operations comprising:
maintaining an event log associated with a first processor coupled to a network through a first networking interface, the first processor operatively configured to execute an operating system (OS);

determining and maintaining platform recovery information associated with a memory complex of the host electronic device; and upon expiration of a timer, transmitting platform recovery information and the event log to a remote device by a second processor via a second networking interface independent of the first processor and the OS;

wherein the first and second processors are co-disposed on an integrated circuit.

24. The article of manufacture of claim 23, wherein the plurality of programming instructions, when executed further cause the machine to perform operations comprising:

upon detection of an operational failure associated with the machine, transmitting platform recovery information and the event log to a remote device by a second processor via a second networking interface independent of the first processor and the OS.

25. The article of manufacture of claim 23, wherein the plurality of programming instructions, when executed further cause the machine to perform operations comprising:

receiving restoration information from the remote device; and applying the restoration information to the machine.

* * * * *